US012233932B2

(12) United States Patent
Sun

(10) Patent No.: US 12,233,932 B2
(45) Date of Patent: Feb. 25, 2025

(54) CANOPY ADJUSTMENT MECHANISM AND BABY CARRIER

(71) Applicant: WONDERLAND SWITZERLAND AG, Steinhausen (CH)

(72) Inventor: Mingxing Sun, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 453 days.

(21) Appl. No.: 17/513,275

(22) Filed: Oct. 28, 2021

(65) Prior Publication Data

US 2022/0135107 A1    May 5, 2022

(30) Foreign Application Priority Data

Oct. 30, 2020    (CN) .......................... 202011195714.4

(51) Int. Cl.
*A45B 9/00*     (2006.01)
*A45B 23/00*    (2006.01)
*B62B 5/00*     (2006.01)
*B62B 9/14*     (2006.01)

(52) U.S. Cl.
CPC ............ *B62B 9/142* (2013.01); *B62B 5/0013* (2013.01); *A45B 2009/007* (2013.01); *A45B 2023/0093* (2013.01); *B62B 2205/20* (2013.01)

(58) Field of Classification Search
USPC ..................... 135/88.02–88.4, 132, 133, 142; 297/184.11, 184.13, 184.17
See application file for complete search history.

(56) References Cited

U.S. PATENT DOCUMENTS 270,224 A * 1/1883 Johnson et al. ......... A47C 7/66
                                                         135/133
639,634 A * 12/1899 Valiant .................... E04H 15/06
                                                         135/88.03

(Continued)

FOREIGN PATENT DOCUMENTS

CN        2550239 Y      5/2003
CN      102642556 A      8/2012
                (Continued)

OTHER PUBLICATIONS

Office Action for Japanese Patent App. No. 2021-175637 (Sep. 27, 2022).

(Continued)

*Primary Examiner* — Robert Canfield
(74) *Attorney, Agent, or Firm* — Volpe Koenig

(57) ABSTRACT

The present disclosure provides a canopy adjustment mechanism comprising a canopy, a locking mechanism, and a lock receiving mechanism provided on the canopy. The locking mechanism locks at different positions of the lock receiving mechanism to achieve height adjustment of the canopy. The height of the canopy can be changed to suit children of different heights, and accordingly, the installation position of the canopy can be flexibly changed to meet the needs of users. Moreover, the canopy adjustment mechanism is easy to operate in terms of height adjustment and simple in structure. The present disclosure further provides a baby carrier comprising the aforesaid canopy adjustment mechanism.

28 Claims, 19 Drawing Sheets

(56) References Cited

U.S. PATENT DOCUMENTS

| | | | | |
|---|---|---|---|---|
| 4,083,601 | A * | 4/1978 | McBeth | A47C 7/66 135/96 |
| 4,809,724 | A * | 3/1989 | Fuser | A47C 7/66 248/514 |
| 5,022,420 | A * | 6/1991 | Brim | A01D 67/02 280/47.38 |
| 5,096,257 | A * | 3/1992 | Clark | A47C 1/143 135/96 |
| 5,551,745 | A * | 9/1996 | Huang | B60J 7/1282 135/133 |
| 5,921,258 | A * | 7/1999 | Francois | A61G 5/1054 135/117 |
| 6,105,594 | A * | 8/2000 | Diaz | A45B 17/00 135/88.03 |
| 6,575,656 | B2 * | 6/2003 | Suh | E04H 15/46 403/379.5 |
| 6,764,133 | B2 * | 7/2004 | Osato | A47D 1/08 297/184.13 |
| 6,789,557 | B1 * | 9/2004 | Wahl, Jr. | A47C 7/66 135/120.2 |
| 7,066,676 | B2 * | 6/2006 | Tsai | F16B 7/042 403/379.2 |
| 7,628,369 | B2 * | 12/2009 | Chen | F16B 7/105 248/354.3 |
| 7,963,596 | B2 * | 6/2011 | Efthimiou | A47C 7/66 297/184.17 |
| 8,186,368 | B2 * | 5/2012 | Troutman | B62B 9/14 135/88.02 |
| 8,439,055 | B2 * | 5/2013 | April | A45B 11/00 280/47.38 |
| 8,479,756 | B1 * | 7/2013 | Tieskotter | B62J 17/08 135/88.03 |
| 9,090,277 | B1 * | 7/2015 | Chen | B62B 9/245 |
| 9,248,072 | B2 * | 2/2016 | Wu | F16B 7/14 |
| 9,956,981 | B1 * | 5/2018 | Fitzwater | B62B 5/082 |
| 10,472,850 | B2 * | 11/2019 | Grace | E04H 15/48 |
| 11,185,167 | B1 * | 11/2021 | Holland | A47C 7/666 |
| 11,370,467 | B1 * | 6/2022 | Horowitz | B62B 3/007 |
| 2002/0008367 | A1 | 1/2002 | Durham | |
| 2002/0024229 | A1 * | 2/2002 | Davies | A45B 11/00 280/47.38 |
| 2005/0046152 | A1 | 3/2005 | Hutchinson | |
| 2007/0012346 | A1 * | 1/2007 | Choi | F16B 7/105 135/120.3 |
| 2008/0023052 | A1 * | 1/2008 | Barreiro | A45B 11/00 135/88.01 |
| 2009/0194973 | A1 * | 8/2009 | Wang | B62B 7/147 280/642 |
| 2009/0308421 | A1 * | 12/2009 | Ortiz | B62B 5/0013 135/88.02 |
| 2017/0202321 | A1 * | 7/2017 | Maurello | A45B 23/00 |
| 2018/0134306 | A1 * | 5/2018 | Chen | B62B 7/10 |
| 2020/0405063 | A1 * | 12/2020 | Bulger | A47C 13/00 |
| 2021/0403071 | A1 * | 12/2021 | Yi | B62B 7/142 |
| 2023/0099871 | A1 * | 3/2023 | Zhong | B62B 9/104 296/97.21 |

FOREIGN PATENT DOCUMENTS

| | | |
|---|---|---|
| CN | 105383541 A | 3/2016 |
| CN | 210149408 U | 3/2020 |
| DE | 102014114413 B3 | 2/2016 |
| JP | 35-16834 | 7/1935 |
| JP | S57-085359 U | 5/1982 |
| JP | 3178719 U | 9/2012 |
| JP | 2015-051696 A | 3/2015 |
| JP | 2016-064679 A | 4/2016 |
| JP | 2016-117463 A | 6/2016 |
| JP | 2018-062331 A | 4/2018 |
| JP | 2019-043231 A | 3/2019 |
| JP | 2020-133349 A | 8/2020 |
| JP | 2022-74069 A | 5/2022 |

OTHER PUBLICATIONS

First Office Action for Taiwanese Patent App. No. 112128478 (dated Nov. 14, 2023).
Notice of Reasons for Refusal for Japanese Patent App. No. 2021-175637 (Feb. 21, 2023) with English translation thereof.
Notice of Reasons for Refusal for Japanese Patent App. No. 2021-175637 (Jun. 20, 2023) with English translation thereof.
"First Office Action Issued in Corresponding Chinese Patent Application No. 202011195714.4", Mailed Date: Mar. 29, 2024, 17 pages.
"Search Report Issued in Corresponding Japanese Patent Application No. 2023-190730", Mailed Date: Nov. 5, 2024, 46 pages.
"Notice of Reasons for Refusal Issued in Corresponding Japanese Patent Application No. 2023-190730", Mailed Date: Nov. 12, 2024, 8 pages.

* cited by examiner

CANOPY ADJUSTMENT MECHANISM AND BABY CARRIER

This application claims priority under 35 U.S.C. § 119 to Chinese Patent Application No. 202011195714.4, filed Oct. 30, 2020, the entirety of which is incorporated by reference herein.

TECHNICAL FIELD

The present disclosure relates to baby products, and more particularly to a canopy adjustment mechanism and a baby carrier.

BACKGROUND

Baby carriers such as strollers, baby cradles, baby swings and baby playards are often used in combination with a canopy, so that the child within the childcare space on the baby carrier's carrying part can be shielded to some extent and is not completely exposed to the external environment. In this way, children can have a certain degree of psychological security. Most of the baby carriers on the market, as a result, are provided with a canopy. However, existing canopy structure designs do not allow users to have the flexibility to change the installation position as the canopy is fixed on the baby carrier. The canopy can only be selected between a fully closed and a fully opened state, and the installation position of the canopy cannot be flexibly changed according to the user's habits or needs, or suit children of different heights.

SUMMARY

An object of the present invention is to provide a canopy adjustment mechanism that can achieve height adjustment of the canopy to suit children of different heights.

Another object of the present invention is to provide a baby carrier comprising the aforesaid canopy adjustment mechanism.

To achieve the above objects, the present invention provides a canopy adjustment mechanism comprising a canopy, a locking mechanism, and a lock receiving mechanism provided on the canopy. The locking mechanism locks at different positions of the lock receiving mechanism to achieve height adjustment of the canopy.

Compared with the prior art, the canopy adjustment mechanism according to the present disclosure comprises a canopy, a locking mechanism, and a lock receiving mechanism, wherein the locking mechanism can lock at different positions of the lock receiving mechanism to achieve height adjustment of the canopy, so that the canopy adjustment mechanism can suit children of different heights. Moreover, in terms of height adjustment, the canopy adjustment mechanism according to the present disclosure is easy to operate and simple in structure.

Preferably, the canopy adjustment mechanism further comprises a securing base, and the canopy comprises a first support, a second support, and an inserting base. The inserting base is connected to the securing base, and the first support and the second support are pivotally connected to the inserting base respectively.

Preferably, the inserting base is slidably movable in the securing base, and the lock receiving mechanism is provided on the inserting base.

Preferably, the first support and/or the second support is provided with the lock receiving mechanism.

Preferably, the lock receiving mechanism comprises locking portions, the inserting base is provided with at least two locking portions along an axial direction, the locking mechanism comprises a locking member which can be operated to engage with one locking portion, and when the locking member is operated to disengage from one of the locking portions, the canopy can be operated to move to cause the locking member to engage with the other one of the locking portions.

Preferably, the canopy adjustment mechanism further comprises a driving portion, and engagement between the locking member and the locking portion is achieved through the action of the driving portion.

Preferably, the securing base has a first through groove, the locking member has a second through groove, and the inserting base sequentially slides through the second through groove and the first through groove.

Preferably, one end of the driving portion is connected to the locking member, the other end of the driving portion is connected to the securing base, and the driving portion constantly moves the locking member toward the locking portion to engage therewith.

Preferably, the securing base comprises a securing base body and a cover connected to the securing base body, the securing base body has a receiving space at a top thereof, and the locking member and the cover are sequentially mounted into the receiving space.

Preferably, the securing base body has two lugs at the top thereof, and the two lugs and the securing base body enclose the receiving space.

Preferably, the lugs are provided with a first restraining portion and a second restraining portion to limit a moving distance of the locking member.

Preferably, the locking member is positioned between the first restraining portion and the second restraining portion, one end of the locking member extends out of the first restraining portion to be connected to the driving portion, and the other end of the locking member extends out of the second restraining portion to form an operating portion, which is operated to drive the locking member to overcome an elastic force of the driving portion so that the locking member is released from the locking portion.

Preferably, the inserting base comprises a connecting base and a sliding portion extending along the connecting base, the sliding portion sequentially slides through the second through groove and the first through groove, and the sliding portion has the locking portions along the axial direction.

Preferably, the first support and the second support each includes a securing portion and/or a canopy bar slidably connected to the securing portion.

Preferably, the securing portion is provided with the lock receiving mechanism.

Preferably, one of the securing portion and the canopy bar is provided with the locking mechanism, and the other one of the securing portion and the canopy bar is provided with the lock receiving mechanism.

Preferably, the canopy bar has an insertion hole, the securing portion has an elongated groove that matches with the insertion hole, the lock receiving mechanism comprises locking portions located within the elongated groove, the locking mechanism comprises a locking member configured to pass through the locking portion and the insertion hole, and the locking member engages with the locking portion to cause the securing portion and the canopy bar to be secured relative to each other.

Preferably, the canopy adjustment mechanism further comprises a driving portion, and engagement between the locking member and the locking portion is achieved through the action of the driving portion.

Preferably, the driving portion protrudes from two sides of the elongated groove, and the engagement between the locking member and the locking portion is achieved through the driving portion.

Preferably, the securing portion has arc-shaped grooves located close to two sides of the elongated groove, with each arc-shaped groove protruding toward the direction of the elongated groove, and the driving portion is located between the arc-shaped groove and the elongated groove.

Preferably, the securing portion has a sliding groove that allows the canopy bar to slidably move therein, the canopy bar has the locking portions along an axial direction, the locking member is disposed on the securing portion, and the locking member can be operated so as to be locked into or released from the locking portion.

Preferably, the driving portion is located between the locking member and the securing portion.

Preferably, the securing portion has a receiving hole, and a first end of the locking member is inserted into the receiving hole to engage with the locking portion.

Preferably, a second end of the locking member is connected to one end of the driving portion, and the one end of the driving portion is connected to the securing portion.

Preferably, the first end of the locking member is provided with a locking pin, which is inserted into the receiving hole to engage with the locking portion.

Preferably, a bump portion is provided between the first end and the second end, the securing portion has a mounting groove, and the locking member is disposed in the mounting groove and pivotally connected to the securing portion at the bump portion, which has one side abutting against the securing portion.

Preferably, the canopy bar has a restraining groove, and the securing portion has a restraining pin cooperating with the restraining groove to limit a moving distance of the canopy bar.

Correspondingly, the present disclosure provides a baby carrier comprising a frame and the foregoing canopy adjustment mechanism disposed on the frame, wherein the frame comprises a front leg, a rear leg, and a handle.

Further aspects of the present invention will become clear from the description below and the accompanying drawings, while the embodiments of the invention will be described and discussed in more detail with reference to the accompanying drawings.

DETAILED DESCRIPTION

Figure 1:
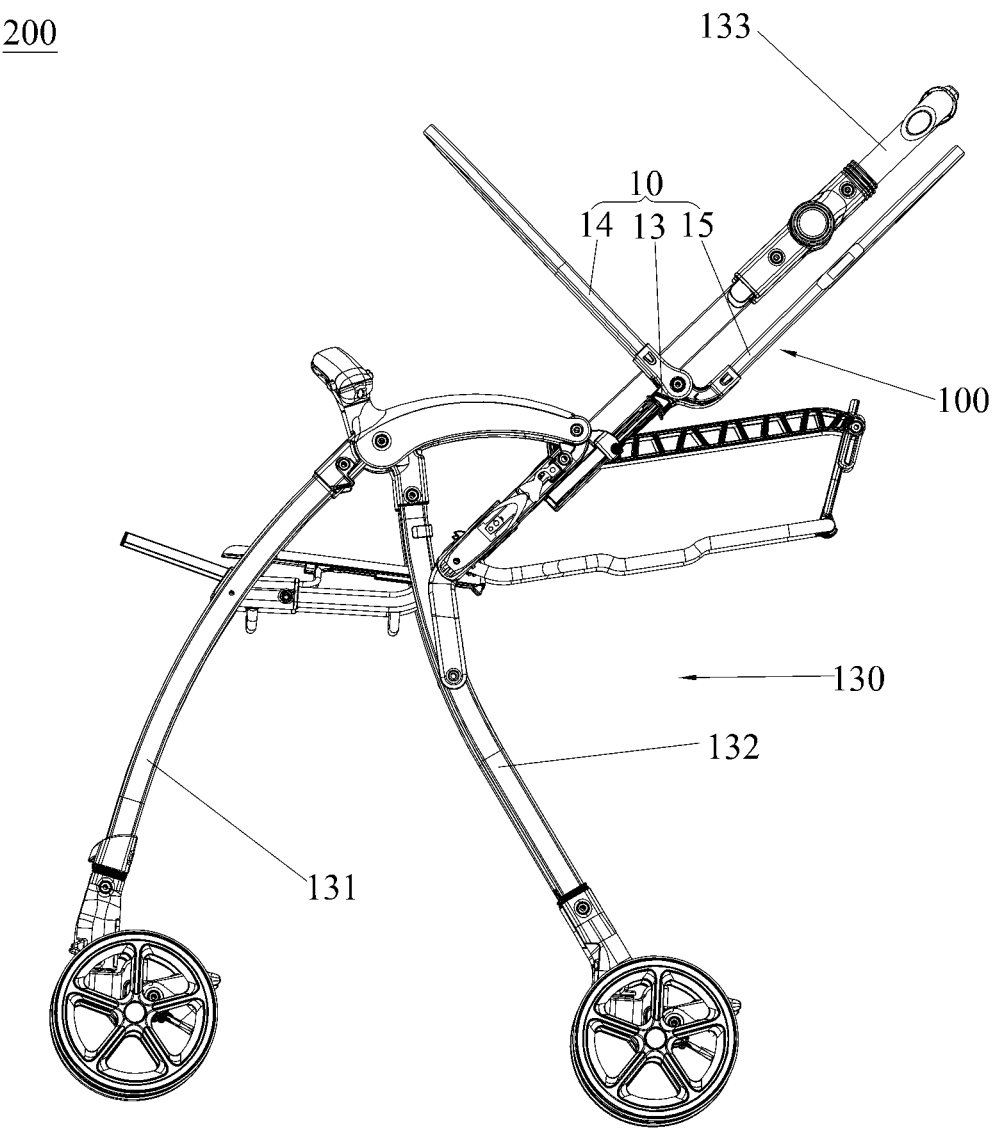
FIG. 1 is a schematic view illustrating the structure of a canopy adjustment mechanism on a baby carrier according to a first embodiment of the present invention, with the canopy at a first height.

The embodiments of the present invention will now be described with reference to the accompanying drawings, in which like reference numerals refer to similar elements.

Figure 2:
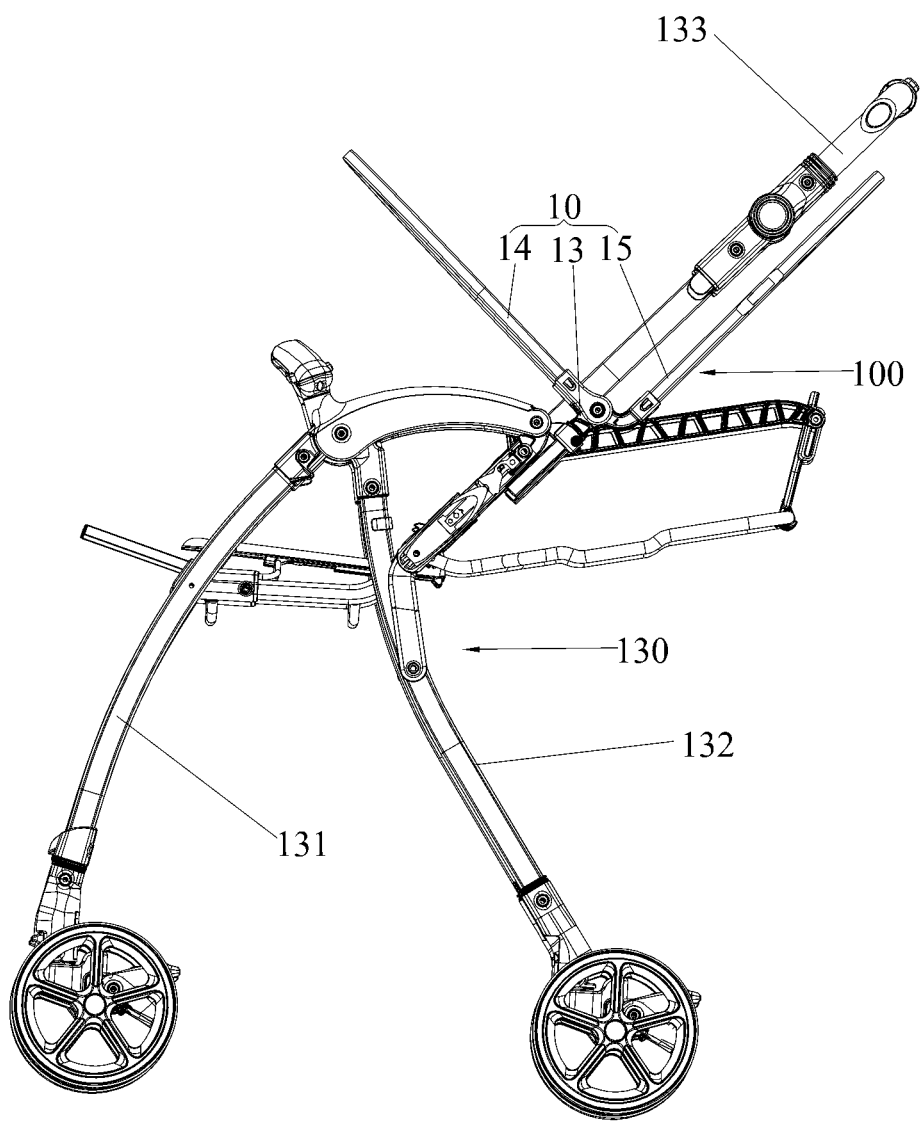
FIG. 2 is a schematic view illustrating the structure of the baby carrier shown in FIG. 1 when the canopy is at a second height.

Please refer to FIGS. 1-2. A baby carrier 200 according to the present invention comprises a frame 130 and a canopy adjustment mechanism 100 disposed on the frame 130. The frame 130 comprises a front leg 131, a rear leg 132, and a handle 133. The baby carrier 200 can be a stroller, a baby cradle, a baby swing and a baby playard, etc. Height adjustment of the canopy 10 can be achieved through the canopy adjustment mechanism 100. For example, in FIG. 1, the canopy 10 is at a first height, and in FIG. 2, the canopy 10 is at a second height. The height of the canopy 10 can be changed to suit children of different heights, and in this way, the installation position of the canopy can be flexibly changed to meet the needs of users. Detailed description of the canopy adjustment mechanism 100 is as follows.

Figure 3:
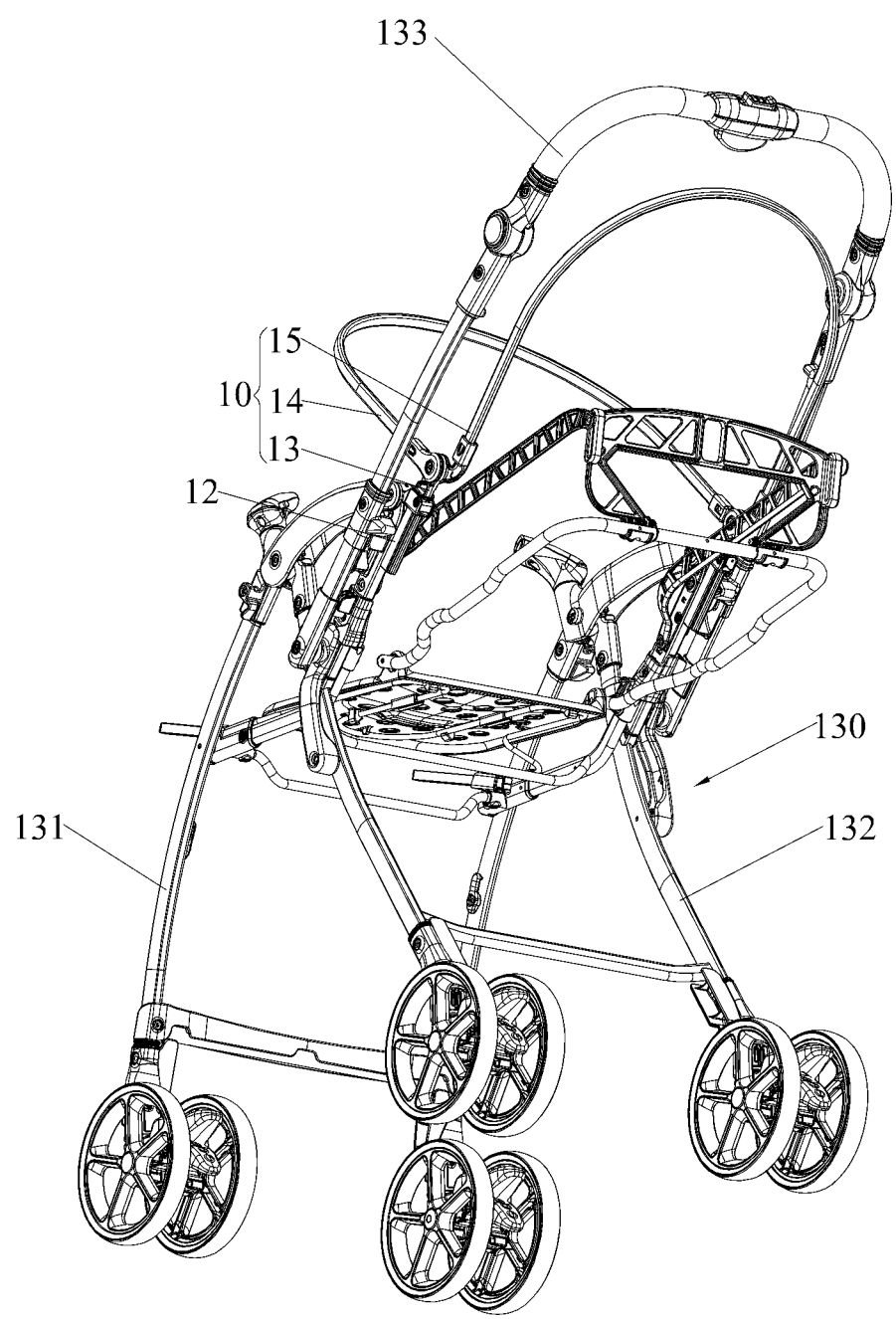
FIG. 3 is a schematic view illustrating the structure of the baby carrier shown in FIG. 1 from another perspective.
Figure 4:
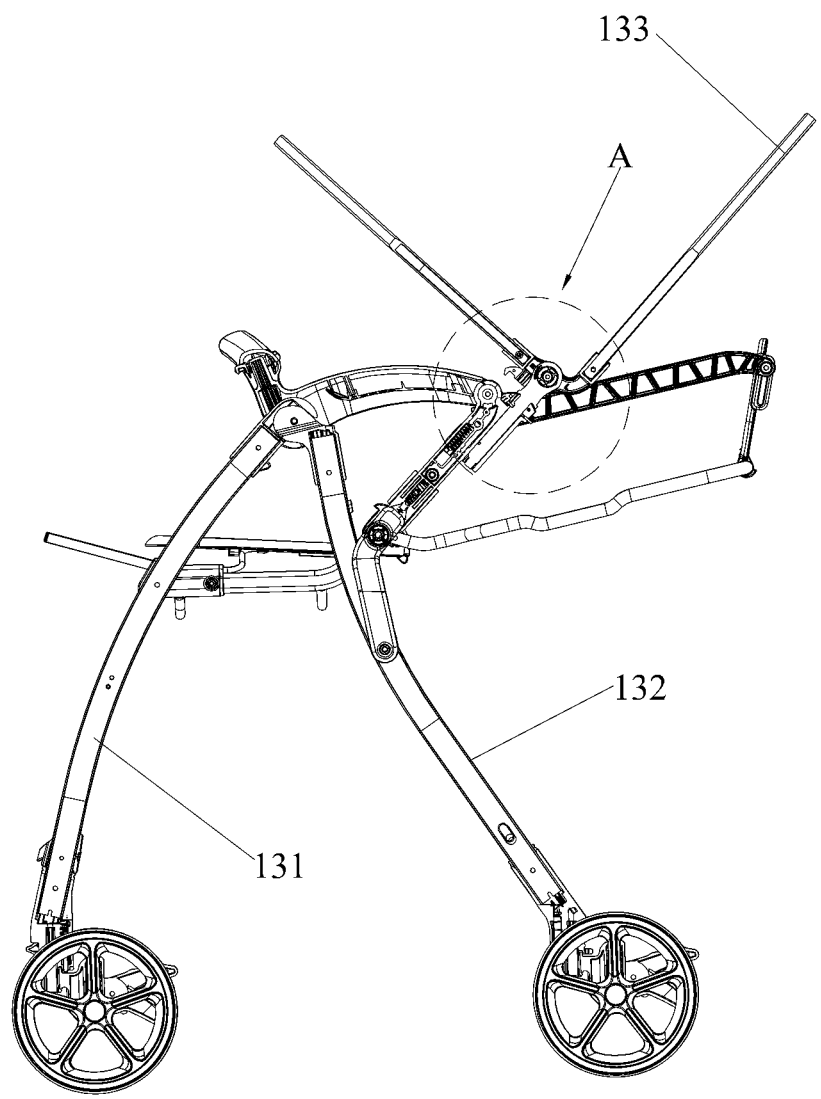
FIG. 4 is a partly cross-sectional view of the baby carrier shown in FIG. 1.
Figure 5:
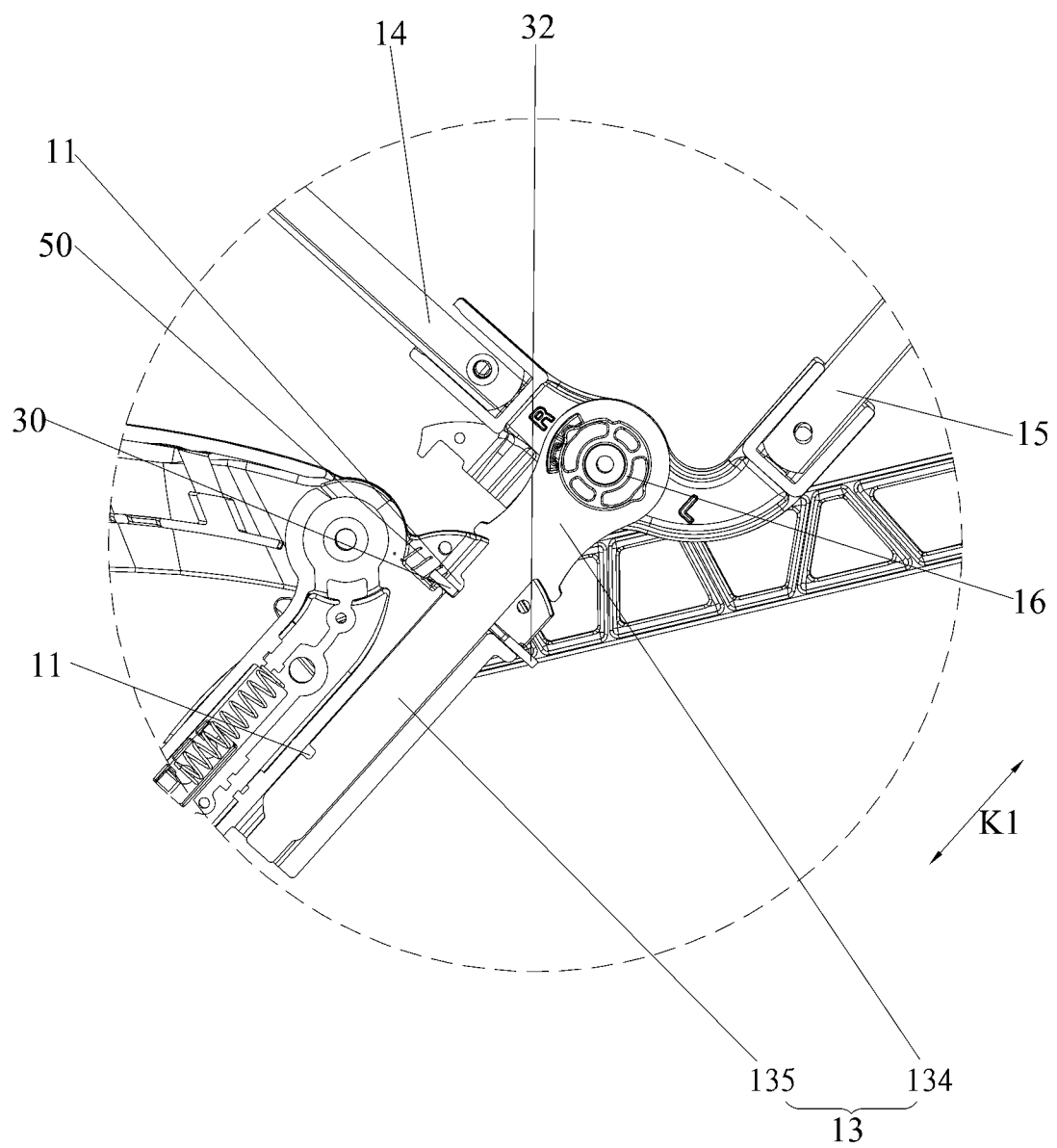
FIG. 5 is an enlarged view of circle A shown in FIG. 4.
Figure 6:
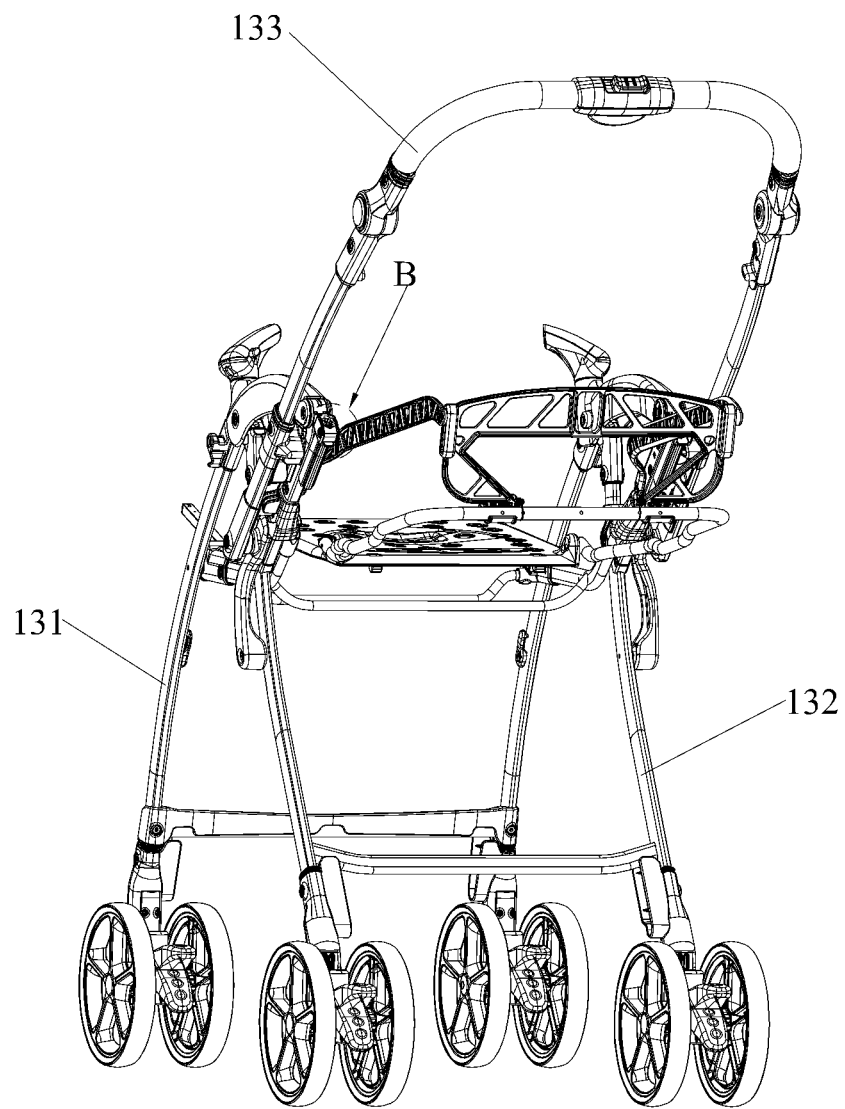
FIG. 6 is a schematic view illustrating the structure of the baby carrier shown in FIG. 3 without the inserting base.

Please refer to FIGS. 3-5. The present invention provides a canopy adjustment mechanism 100 comprising a canopy 10, a locking mechanism and a lock receiving mechanism. The lock receiving mechanism is provided on the canopy 10, and the locking mechanism locks at different positions of the lock receiving mechanism to achieve height adjustment of the canopy 10. That is, the locking mechanism locks at a first position of the lock receiving mechanism, so that the canopy 10 is at the first height; and the locking mechanism locks at a second position of the lock receiving mechanism, so that the canopy 10 is at the second height. In addition, the canopy adjustment mechanism 100 further comprises a securing base 12, which can be provided on the baby carrier 200. The canopy 10 comprises an inserting base 13, a first support 14 and a second support 15. The inserting base 13 is connected to the securing base 12, and the first support 14 and the second support 15 are pivotally connected to the inserting base 13 respectively. More specifically, in this embodiment, the first support 14 and the second support 15 are rotatably and pivotally connected to the inserting base 13 through the pivot portion 16 respectively.

FIGS. 3-10 illustrate the canopy adjustment mechanism 100 according to the first embodiment of the present invention. The inserting base 13 is slidably movable in the securing base 12, and the lock receiving mechanism is provided on the inserting base 13. The locking mechanism locks at different positions of the lock receiving mechanism, so that the height adjustment of the canopy 10 relative to the frame 130 can be achieved. More specifically, the lock receiving mechanism includes locking portions 11, and the inserting base 13 is provided with at least two locking portions 11 along the axial direction. The locking mechanism includes a locking member 30, which can be operated to engage with a locking portion 11. When the locking member 30 is operated to disengage from one of the locking portions 11 (that is, the locking member 30 is released from one of the locking portions 11), the canopy 10 can be operated to move, so that the locking member 30 engages with the other locking portion 11. Moreover, the canopy adjustment mechanism 100 further comprises a driving portion 50, and the engagement between the locking member 30 and the locking portion 11 is achieved through the action of the driving portion 50. It should be noted that the driving portion 50 may be, but is not limited to, an elastic structure, such as a spring. By using the locking member 30 to engage with the locking portions 11 located at different positions in the axial direction of the inserting base 13, the height of the canopy 10 can be changed accordingly. The canopy adjustment mechanism according to the invention is simple in structure and easy to operate.

Figure 7:
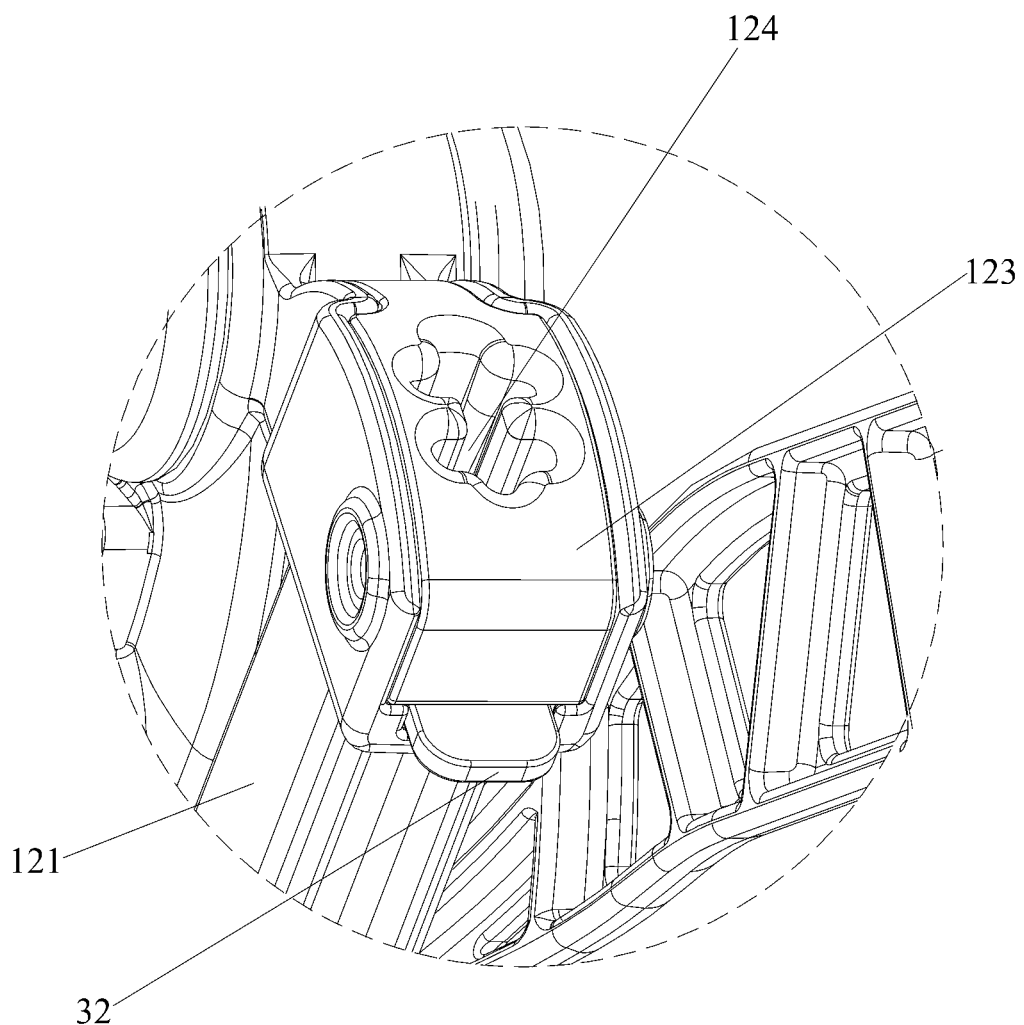
FIG. 7 is an enlarged view of circle B shown in FIG. 6.
Figure 8:
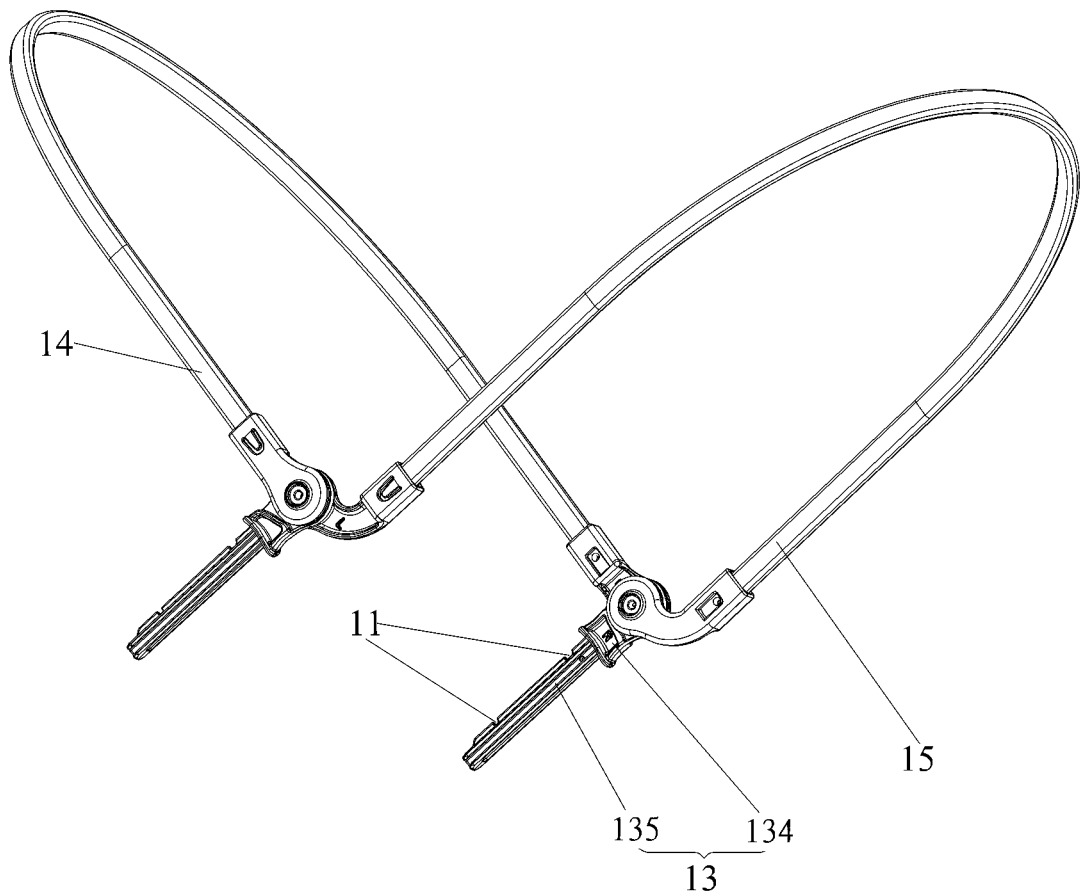
FIG. 8 is a schematic view illustrating the connection structure between the inserting base, a first support and a second support.
Figure 9:
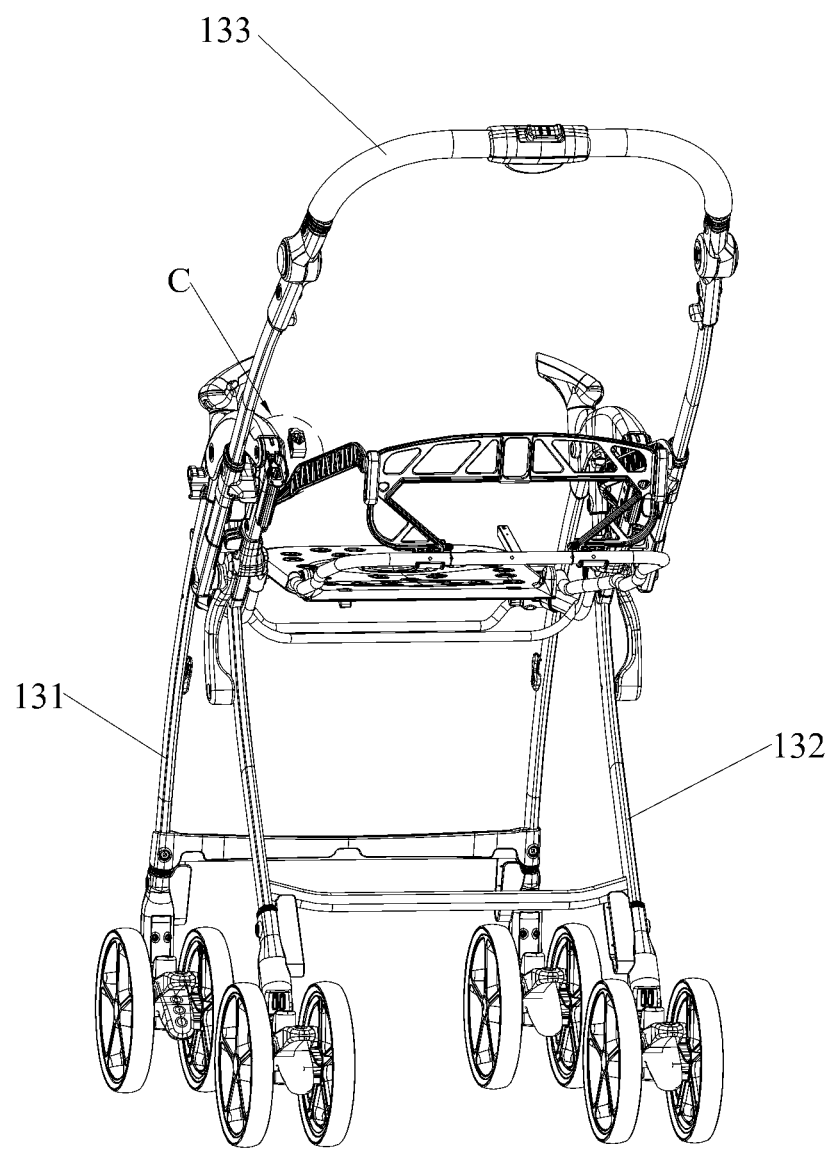
FIG. 9 is a partly exploded view of the baby carrier shown in FIG. 3.
Figure 10:
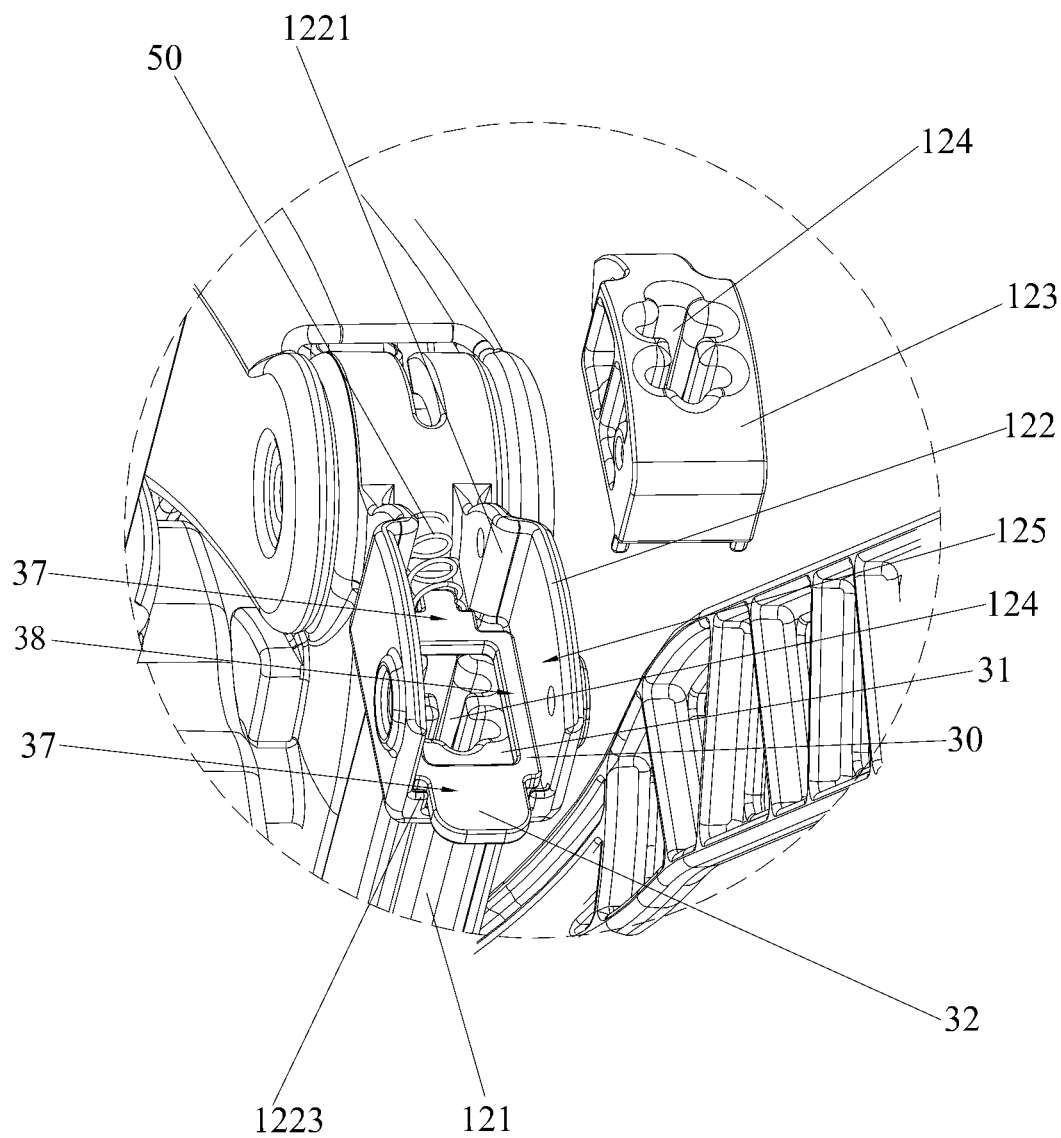
FIG. 10 is an enlarged view of circle C shown in FIG. 9.
Figure 11:
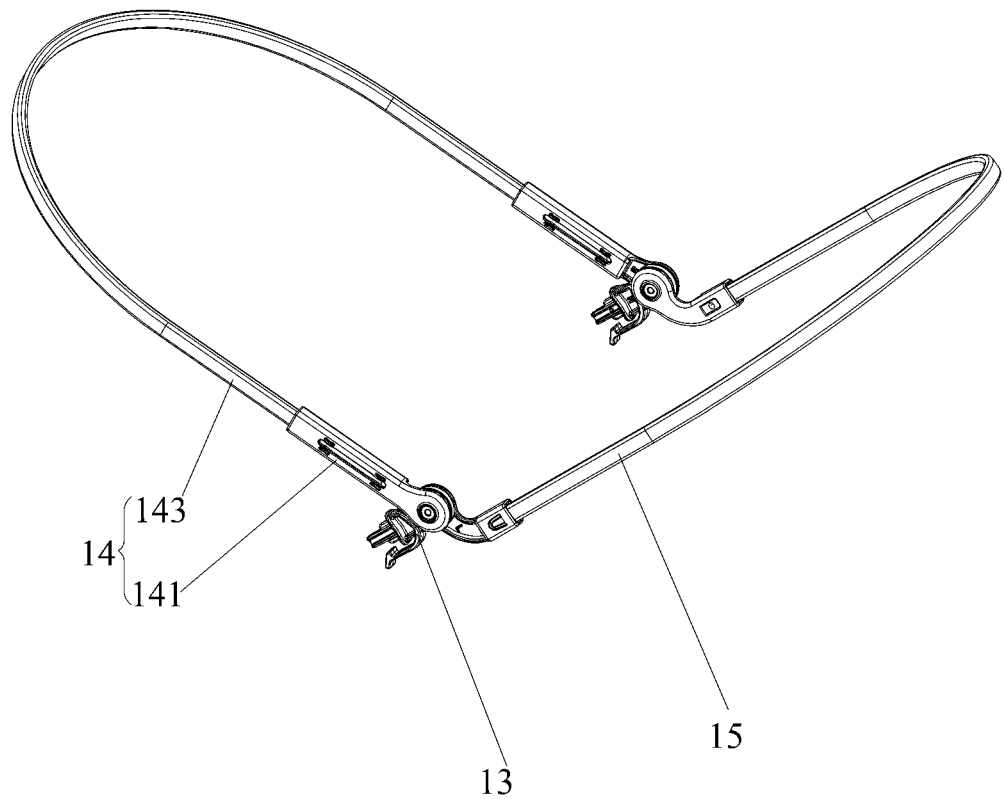
FIG. 11 is a schematic view illustrating the structure of a canopy adjustment mechanism for a baby carrier according to a second embodiment of the present invention.
Figure 12:
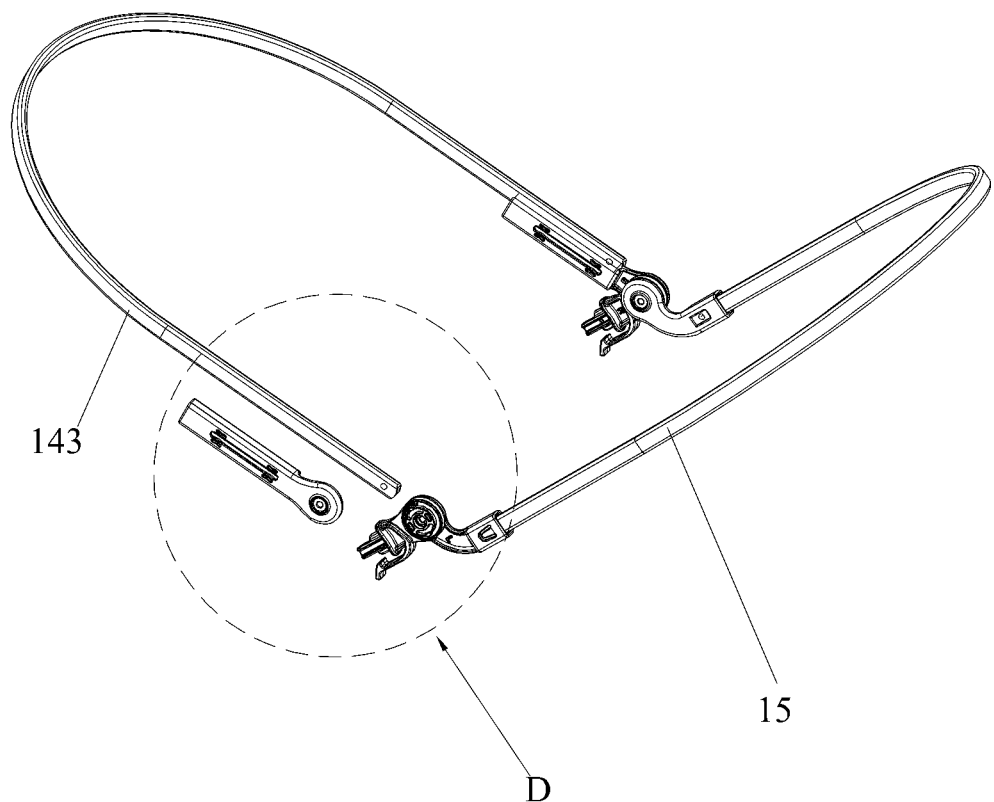
FIG. 12 is a partly exploded view of the canopy adjustment mechanism shown in FIG. 11.

Please refer to FIG. 3. The securing base 12 has a first through groove 124 (as shown in FIG. 7), and the locking member 30 has a second through groove 31 (as shown in FIG. 10). The inserting base 13 slides through the second through groove 31 and the first through groove 124 in sequence, but it is not limited thereto. Please refer to FIG. 5. One end of the driving portion 50 is connected to the locking member 30, and the other end of the driving portion 50 is connected to the securing base 12. The inserting base 13 has locking portions 11 along the axial direction (the direction indicated by K1 as shown in FIG. 5), and the driving portion 50 constantly moves the locking member 30 toward a locking portion 11 to engage with one of the locking portions 11. When the locking member 30 is operated to disengage from one of the locking portions 11, the inserting base 13 can be operated to move within the first through groove 124, so that the locking member 30 engages with another locking portion 11. The driving portion 50 described above can be a spring, but is not limited thereto. In this embodiment, two locking portions 11 are provided, but the number is not limited thereto. Surely more locking portions 11 may be provided as needed. Meanwhile, the engagement between the locking member 30 and the locking portion 11 can be achieved by employing a mating connection of two components with convex and concave shapes; for example, a mating connection of a bump and a groove may be used. The inserting base 13 can move up and down in the second through groove 31 and the first through groove 124, and the locking member 30 is used to engage with one of the locking portions 11, so that the inserting base 13 is secured at a certain position. By operating the locking member 30 to overcome the elastic force of the driving portion 50, the locking member 30 can be released from the engagement with the locking portion 11. And by pulling the inserting base 13 up and down so that the locking member 30 engages with another one of the locking portions 11, the inserting base 13 can be secured at another position, thereby achieving the height adjustment of the canopy 10 at different positions. More specifically, the inserting base 13 comprises a connecting base 134 and a sliding portion 135 extending along the connecting base 134. The sliding portion 135 sequentially slides through the second through groove 31 and the first through groove 124, and it has the locking portions 11 along the axial direction.

Please refer to FIG. 10. The securing base 12 comprises a securing base body 121 and a cover 123 connected to the securing base body 121. The securing base body 121 has a receiving space 125 at its top, and the locking member 30 and the cover 123 are sequentially mounted into the receiving space 125. More specifically, the securing base body 121 has two lugs 122 at its top, and the two lugs 122 and the securing base body 121 enclose the receiving space 125. Moreover, the securing base body 121 and the cover 123 each has a corresponding first through groove 124. In this embodiment, the securing base 12 is connected to the frame 130. The locking member 30 is positioned between the securing base body 121 and the cover 123; the inserting base 13 can sequentially pass through the first through groove 124 of the cover 123, the second through groove 31 of the locking member 30, and the first through groove 124 of the securing base body 121. Further, the lugs 122 are provided with a first restraining portion 1221 and a second restraining portion 1223 that limit the moving distance of the locking member 30, so as to ensure that the locking member 30 will not cause damage to the driving portion 50 or easily leave the receiving space 125. Furthermore, the width of the middle portion 38 of the locking member 30 is larger than the width of the two ends 37 thereof. The locking member 30 is positioned between the first restraining portion 1221 and the second restraining portion 1223. One end of the locking member 30 extends out of the first restraining portion 1221 and is connected to the driving portion 50, and the other end of the locking member 30 extends out of the second restraining portion to form an operating portion 32. When the operating portion 32 is operated, it drives the locking member 30 to overcome the elastic force of the driving portion 50, so that the locking member 30 can be released from the locking portion 11. Since the operating portion 32 is designed to extend out of the receiving space 125, the operating portion 32 is easy to operate and thus disengagement of the locking member 30 from the locking portion 11 can be achieved easily.

FIGS. 11-15 illustrate the second embodiment of the present disclosure. Please refer to FIG. 11. The first support 14 and/or the second support 15 is provided with a lock receiving mechanism. With the locking mechanism locking at different positions of the lock receiving mechanism, the length of the first support 14 and/or the second support 15 can be changed accordingly, so that height adjustment of the canopy 10 relative to the frame 130 can be achieved. More specifically, the first support 14 and the second support 15 each includes a securing portion 141 and a canopy bar 143 slidably connected to the securing portion 141. That is, the purpose of height adjustment of the canopy 10 can be fulfilled by achieving the height adjustment of the first support 14 at different positions through adjusting the lock receiving mechanism at different positions on the first support 14, and also by achieving the height adjustment of the second support 15 at different positions through adjusting the lock receiving mechanism at different positions on the second support 15. It is certain that the height adjustment can be achieved by using both the first support 14 and the second support 15 at the same time. In this embodiment, the height adjustment of the first support 14 is taken as an example for illustration purposes; the height adjustment of the second support 15 can be achieved by adopting a structure similar to that of the first support 14, which will not be described in detail here.

Figure 13:
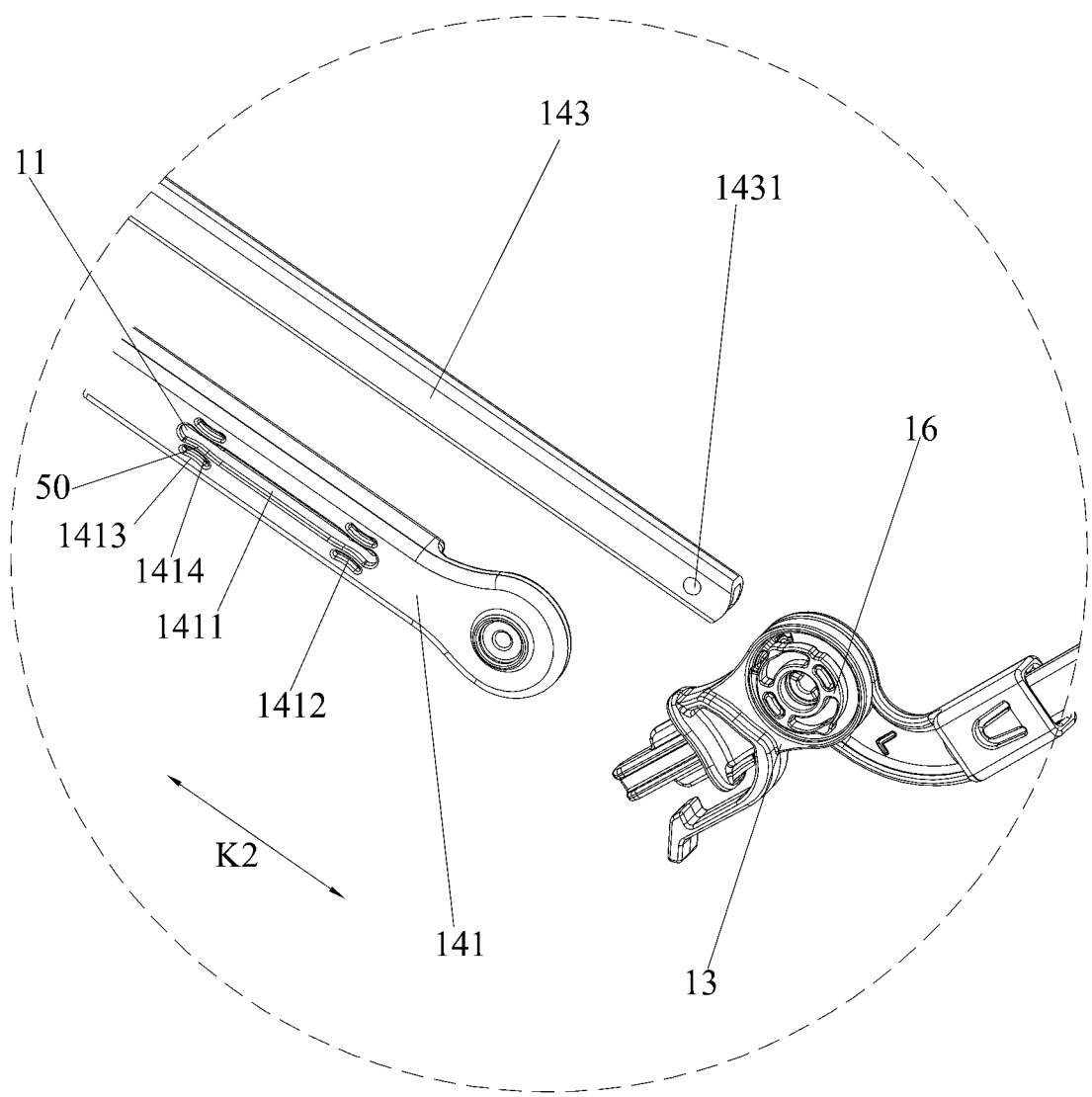
FIG. 13 is an enlarged view of circle D shown in FIG. 12.
Figure 14:
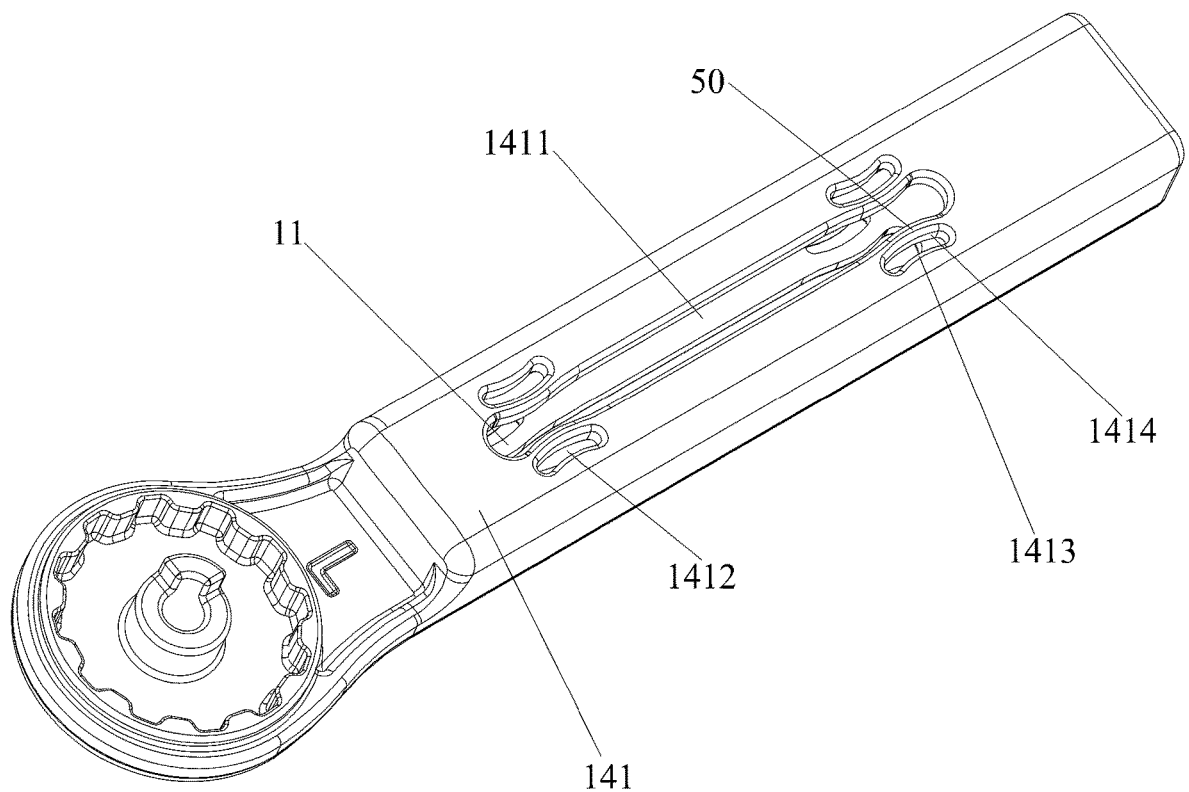
FIG. 14 is a schematic view illustrating the structure of the securing portion shown in FIG. 12.
Figure 15:
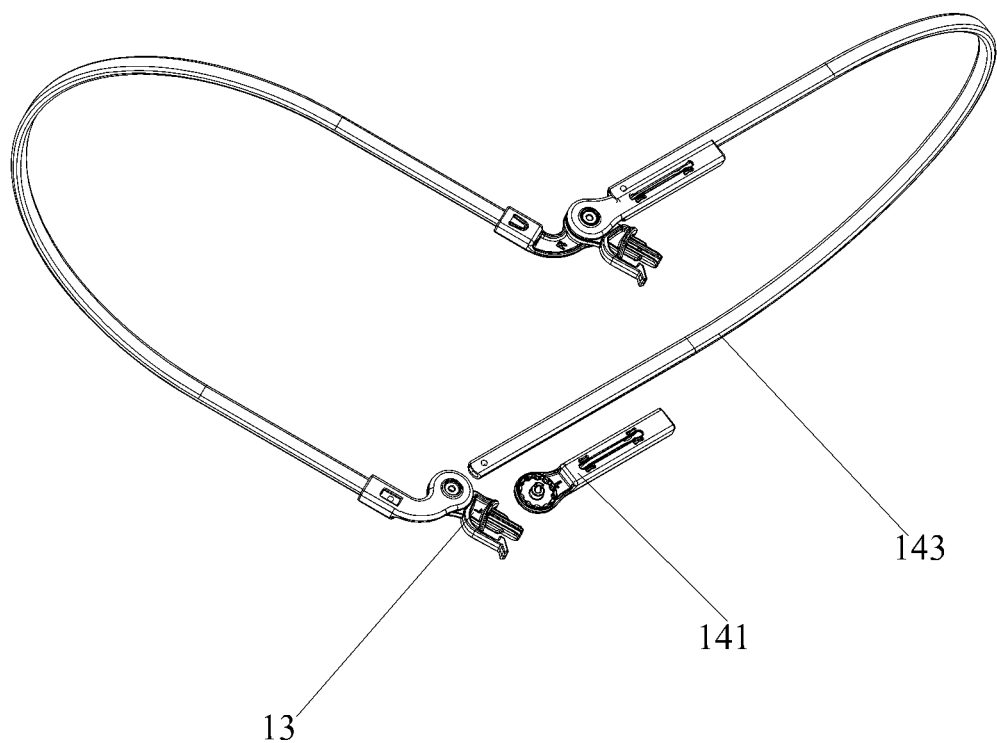
FIG. 15 is a partly exploded view of the canopy adjustment mechanism shown in FIG. 11 from another perspective.
Figure 16:
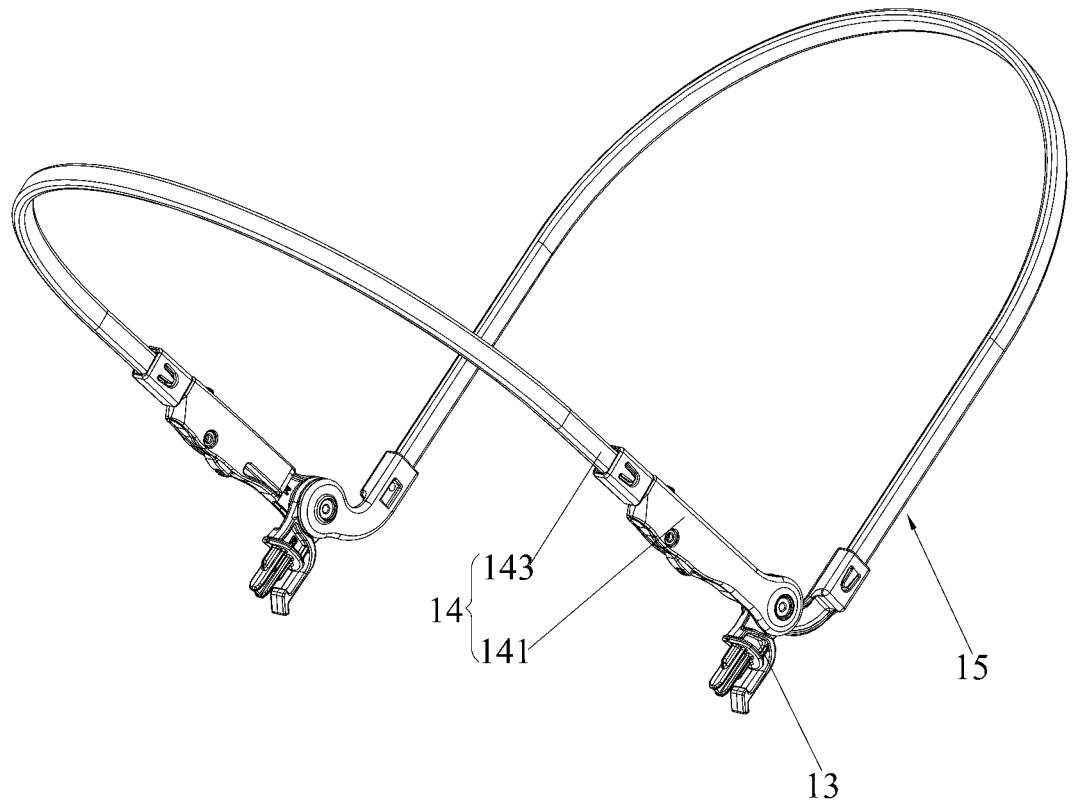
FIG. 16 is a schematic view illustrating the structure of a canopy adjustment mechanism for a baby carrier according to a third embodiment of the present invention.
Figure 17:
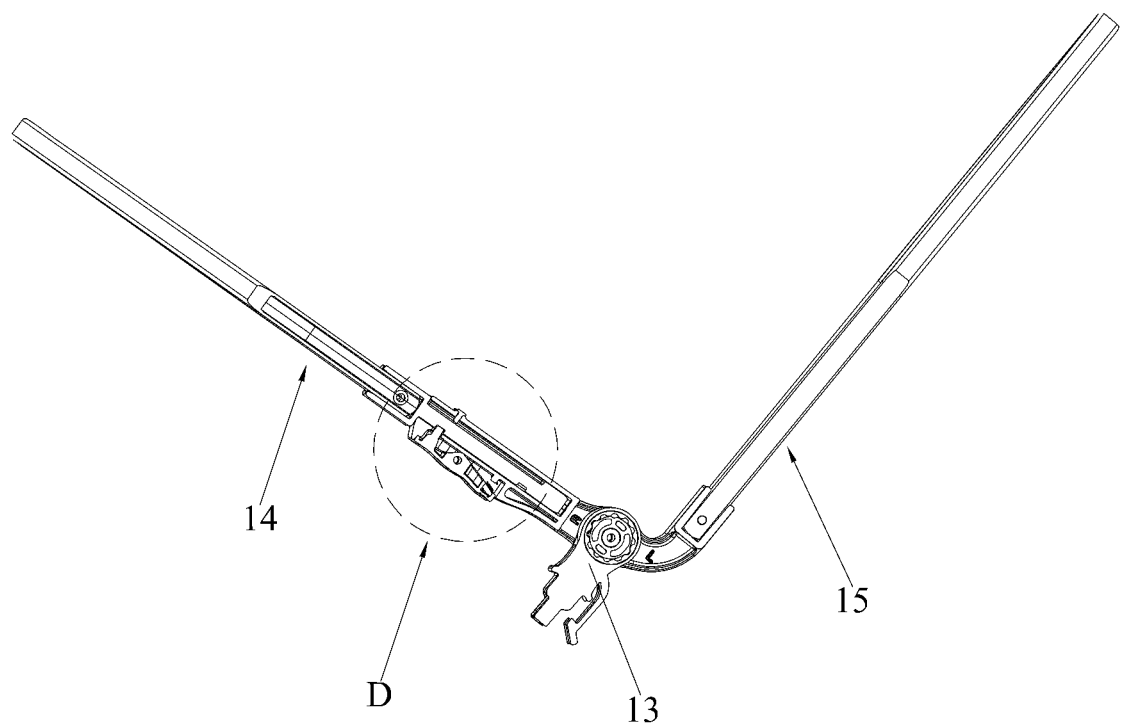
FIG. 17 is a partly cross-sectional view of the canopy adjustment mechanism shown in FIG. 16.

Please refer to FIG. 13 for specific details. The securing portion 141 is provided with a lock receiving mechanism; the locking mechanism can be a separate element or provided on the canopy bar 143. It is certain that one of the securing portion 141 and the canopy bar 143 is provided with a locking mechanism, and the other of them is provided with a lock receiving mechanism. In this embodiment, a situation where the securing portion 141 is provided with a lock receiving mechanism and the locking mechanism is a separate element is specifically explained. Other situations will definitely become apparent with reference to this embodiment. Specifically, the first support 14 comprises the securing portion 141 connected to the inserting base 13 and the canopy bar 143 slidably connected to the securing portion 141. It can be understood that the securing portion 141 and the canopy bar 143 slide relative to each other, and the height adjustment of the first support 14 at different positions is achieved by engaging the locking portion 11 with the locking member 30 so as to cause the securing portion 141 and the canopy bar 143 secured at different positions. Please refer to FIGS. 13-15. The canopy bar 143 has insertion holes 1431, and each securing portion 141 has an elongated groove 1411 that matches with an insertion hole 1431. The lock receiving mechanism includes locking portions 11, and the driving portion 50 is configured to protrude from two sides of the elongated groove 1411, with the locking portions 11 located within the elongated groove 1411. The locking mechanism includes a locking member (not shown). The locking portions 11 are arranged along the length direction of the elongated groove 1411 (the direction indicated by K2 as shown in FIG. 13). The locking member is configured to pass through the locking portion 11 and the insertion hole 1431. The locking member is a separate element and may be, but is not limited to, a pin, a rivet, etc. In other embodiments, the locking member protrudes from the canopy bar 143 and is integrally formed with the canopy bar 143, while the above effects can still be achieved. The canopy adjustment mechanism 100 further comprises the driving portion 50, and the engagement between the locking member 30 and one locking portion 11 is achieved through the action of the driving portion 50. It should be noted that the driving portion 50 may be, but is not limited to, an elastic structure. With the help of the driving portion 50, engagement between the locking portion 11 and the locking member is achieved, thereby securing the securing portion 141 and the canopy bar 143 relative to each other. The canopy bar 143 is operated to move, driving the locking member to disengage from one of the locking portions 11, and therefore, the locking member can move to another position in the elongated groove 1411 to engage with another locking portion 11. Since the driving portion 50 is configured to protrude from the elongated groove 1411, the width of the elongated groove 1411 is reduced at certain point to form the locking portion 11 in the elongated groove 1411. Moreover, the securing portion 141 has arc-shaped grooves 1412 located close to two sides of the elongated groove 1411, with each arc-shaped groove 1412 protruding toward the direction of the elongated groove 1411; the driving portion 50 is located between the arc-shaped groove 1412 and the elongated groove 1411. Since the arc-shaped groove 1412 protrudes toward the direction of the elongated groove 1411, the elasticity of the driving portion 50 can be further improved. The arc-shaped groove 1412 has a first curved edge 1413 and a second curved edge 1414. Both of the first curved edge 1413 and the second curved edge 1414 protrude toward the elongated groove 1411, thereby improving the buffer performance of the driving portion 50 to achieve smooth buffering; also, the service life of the driving portion 50 can be extended. During use, when an external force pulls the canopy bar 143 outward, the locking member 30 moves along with the canopy bar 143 to overcome the buffering elasticity of the driving portion 50 between the elongated groove 1411 and the arc-shaped groove 1412. As a result, the locking member 30 disengages from one of the locking portions 11 and moves to the other one of the locking portions 11 to engage therewith, and the height adjustment of the canopy bar 143 is then achieved.

Figure 18:
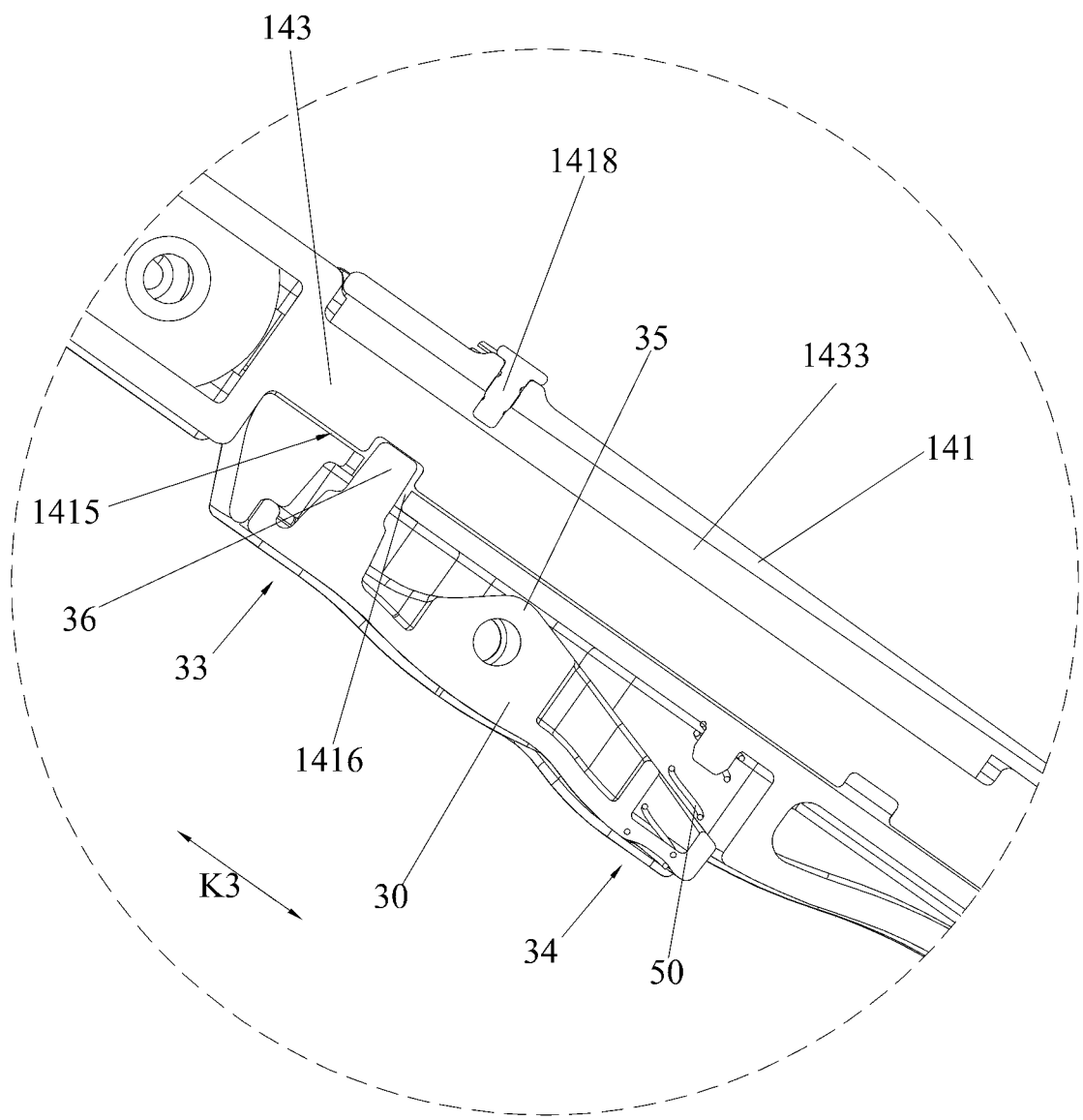
FIG. 18 is an enlarged view of circle E shown in FIG. 17.
Figure 19:
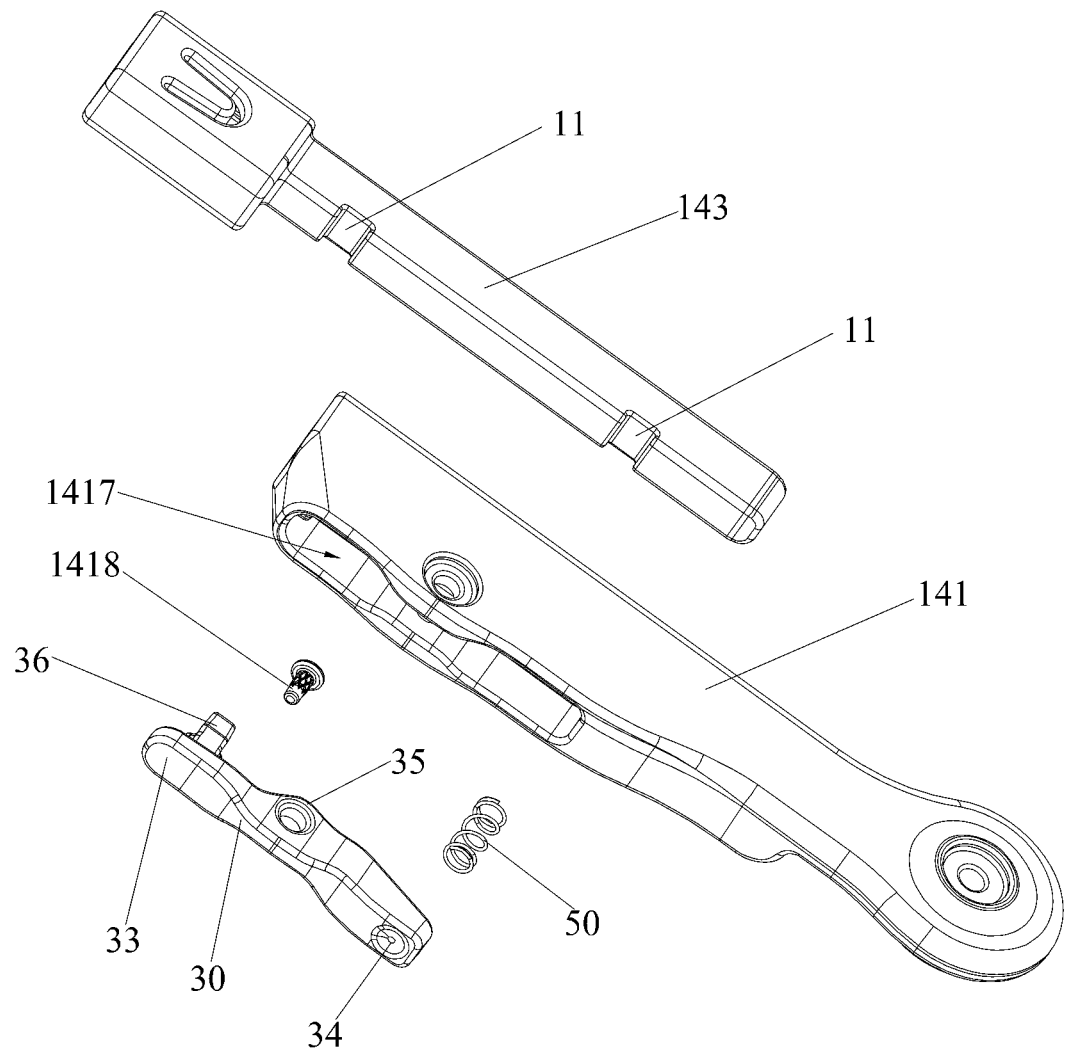
FIG. 19 is a partly exploded view of the canopy adjustment mechanism shown in FIG. 16.

FIGS. 16-19 illustrate the third embodiment of the present disclosure. In this embodiment, the first support 14 is taken as an example to describe its height adjustment; the second support 15 can adopt a structure similar to the one with the first support 14 to achieve the height adjustment thereof, which will not be described in detail here. Please refer to FIGS. 18-19. The securing portion 141 has a sliding groove 1415 that allows the canopy bar 143 to slidably move therein, and the canopy bar 143 has locking portions 11 along the axial direction (the direction indicated by K3 as shown in FIG. 18). The driving portion 50 is positioned between the locking member 30 and the securing portion 141, and the locking member 30 can be operated so that it is locked into or released from the locking portions 11. More specifically, the securing portion 141 has a receiving hole 1416, and a first end 33 of the locking member 30 is inserted into the receiving hole 1416 to engage with the locking portion 11. A second end 34 of the locking member 30 is connected to the driving portion 50, which has one end connected to the securing portion 141. When the locking member 30 is operated to disengage from one of the locking portions 11, the canopy bar 143 can be operated to move so that the locking member 30 engages with the other one of the locking portions 11. In this embodiment, two locking portions 11 are provided, but the number is not limited thereto. Further, the first end 33 of the locking member 30 is provided with a locking pin 36, and a bump portion 35 is provided between the first end 33 and the second end 34; the locking pin 36 is inserted into the receiving hole 1416 to engage with the locking portion 11. The securing portion 141 has a mounting groove 1417; the locking member 30 is disposed in the mounting groove 1417 and is pivotally connected to the securing portion 141 at the bump portion 35, which has one side abutting against the securing portion 141 to form a pivot point. Given the bump portion 35 on the locking member 30 that abuts against the securing portion 141, together with the arrangement of the first end 33 and the second end 34, the locking member 30 is able to move in a seesaw manner; consequently, it is easy to operate the second end 34 of the locking member 30 and thereby cause the locking pin 36 to disengage from the locking portions 11. The canopy bar 143 has a restraining groove 1433, and the securing portion 141 has a restraining pin 1418 that cooperates with the restraining groove 1433 to limit the moving distance of the canopy bar 143, so that the canopy bar 143 can be prevented from leaving the sliding groove 1415. During use, when an external force presses the second end 34 of the locking member 30 to overcome the elastic force of the driving portion 50, the locking member 30 can be disengaged from the one of the locking portions 11. After the disengagement, the canopy bar 143 is operated to move until the locking member 30 engages with the other one of the locking portions 11, thereby achieving the height adjustment of the canopy bar 143.

Compared with the prior art, the canopy adjustment mechanism 100 according to the present disclosure comprises a canopy 10, a locking mechanism and a lock receiving mechanism, wherein the locking mechanism can lock at different positions of the lock receiving mechanism to achieve height adjustment of the canopy. Thus, the canopy adjustment mechanism 100 can suit children of different heights, and is easy to operate in terms of height adjustment and simple in structure.

Although the present invention has been described in conjunction with preferred embodiments, it is to be understood that the invention is not limited to the embodiments disclosed above and should cover various modifications and equivalent combinations that are made based on the essence of the invention.

What is claimed is:

1. A canopy adjustment mechanism, comprising:
   a canopy,
   a locking mechanism,
   a lock receiving mechanism provided on the canopy, and
   a securing base comprising a securing base body having two lugs at the top thereof,
   wherein the locking mechanism locks at different positions of the lock receiving mechanism to achieve height adjustment of the canopy.

2. The canopy adjustment mechanism of claim 1, wherein the canopy comprises a first support, a second support, and an inserting base; and wherein the inserting base is connected to the securing base, and the first support and the second support are pivotally connected to the inserting base respectively.

3. The canopy adjustment mechanism of claim 2, wherein the inserting base is slidably movable in the securing base.

4. The canopy adjustment mechanism of claim 2, wherein the inserting base is provided with the lock receiving mechanism.

5. The canopy adjustment mechanism of claim 3, wherein the inserting base is provided with at least two locking portions along an axial direction, the locking mechanism comprises a locking member which can be operated to engage with one locking portion, and when the locking member is operated to disengage from one of the locking portions, the canopy can be operated to move to cause the locking member to engage with the other one of the locking portions.

6. The canopy adjustment mechanism of claim 5, further comprising a driving portion, wherein engagement between the locking member and the one of the locking portions is achieved through the action of the driving portion.

7. The canopy adjustment mechanism of claim 6, wherein the securing base has a first through groove, the locking member has a second through groove, and the inserting base slides through the second through groove and the first through groove.

8. The canopy adjustment mechanism of claim 6, wherein one end of the driving portion is connected to the locking member, the other end of the driving portion is connected to the securing base, and the driving portion constantly moves the locking member toward the one locking portion to engage therewith.

9. The canopy adjustment mechanism of claim 6, wherein the securing base further comprises a cover connected to the securing base body, the securing base body has a receiving space at a top thereof, and the locking member and the cover are mounted into the receiving space.

10. The canopy adjustment mechanism of claim 9, wherein the two lugs and the securing base body enclose the receiving space.

11. The canopy adjustment mechanism of claim 10, wherein the lugs are provided with a first restraining portion and a second restraining portion to limit a moving distance of the locking member.

12. The canopy adjustment mechanism of claim 11, wherein the locking member is positioned between the first restraining portion and the second restraining portion, one end of the locking member extends out of the first restraining portion to be connected to the driving portion, and the other end of the locking member extends out of the second restraining portion to form an operating portion, which is operated to drive the locking member to overcome an elastic force of the driving portion so that the locking member is released from the one locking portion.

13. The canopy adjustment mechanism of claim 5, wherein the inserting base comprises a connecting base and a sliding portion extending along the connecting base, and the sliding portion has the locking portions along the axial direction.

14. The canopy adjustment mechanism of claim 4, wherein the first support and the second support each includes a securing portion and a canopy bar slidably connected to the securing portion.

15. The canopy adjustment mechanism of claim 14, wherein the securing portion is provided with the lock receiving mechanism.

16. The canopy adjustment mechanism of claim 14, wherein one of the securing portion and the canopy bar is provided with the locking mechanism, and the other one of the securing portion and the canopy bar is provided with the lock receiving mechanism.

17. The canopy adjustment mechanism of claim 15, wherein the canopy bar has an insertion hole, the securing portion has an elongated groove matching with the insertion hole, the lock receiving mechanism comprises locking portions located within the elongated groove, the locking mechanism comprises a locking member configured to pass through one locking portion and the insertion hole, and the locking member engages with the one locking portion to cause the securing portion and the canopy bar to be secured relative to each other.

18. The canopy adjustment mechanism of claim 17, further comprising a driving portion, wherein engagement between the locking member and the one locking portion is achieved through the action of the driving portion.

19. The canopy adjustment mechanism of claim 18, wherein the driving portion protrudes from two sides of the elongated groove, and the engagement between the locking member and the one locking portion is achieved through the driving portion.

20. The canopy adjustment mechanism of claim 19, wherein the securing portion has arc-shaped grooves located close to two sides of the elongated groove, with each arc-shaped groove protruding toward the direction of the elongated groove, and the driving portion is located between the arc-shaped groove and the elongated groove.

21. The canopy adjustment mechanism of claim 17, wherein the securing portion has a sliding groove that allows the canopy bar to slidably move therein, the canopy bar has the locking portions along an axial direction, the locking member is disposed on the securing portion, and the locking member can be operated so as to be locked into or released from the locking portions.

22. The canopy adjustment mechanism of claim 21, wherein the driving portion is located between the locking member and the securing portion.

23. The canopy adjustment mechanism of claim 21, wherein the securing portion has a receiving hole, and a first end of the locking member is inserted into the receiving hole to engage with a locking portion.

24. The canopy adjustment mechanism of claim 23, wherein a second end of the locking member is connected to one end of the driving portion, and the one end of the driving portion is connected to the securing portion.

25. The canopy adjustment mechanism of claim 23, wherein the first end of the locking member is provided with a locking pin, which is inserted into the receiving hole to engage with a locking portion.

26. The canopy adjustment mechanism of claim 24, wherein a bump portion is provided between the first end and the second end, the securing portion has a mounting groove, and the locking member is disposed in the mounting groove and pivotally connected to the securing portion at the bump portion, which has one side abutting against the securing portion.

27. The canopy adjustment mechanism of claim 21, wherein the canopy bar has a restraining groove, and the securing portion has a restraining pin cooperating with the restraining groove to limit a moving distance of the canopy bar.

28. A baby carrier, comprising a frame which comprises a front leg, a rear leg, and a handle, wherein the baby carrier further comprises a canopy adjustment mechanism according to claim 1 disposed on the frame.

\* \* \* \* \*